United States Patent [19]
Racasens et al.

[11] 3,777,805
[45] Dec. 11, 1973

[54] REFRACTORY MEMBERS FOR USE IN TERMINAL REGENERATORS OR RECUPERATORS

[75] Inventors: Joseph Racasens, Sorgues; Pierre Blanchet, Juvisy-sur-Orge; Jacques Duchenoy, Vedene, all of France

[73] Assignee: L'Electro-Refractaire, Paris, France

[22] Filed: June 21, 1972

[21] Appl. No.: 264,954

[30] Foreign Application Priority Data
June 22, 1971 France .................................. 7122638

[52] U.S. Cl. ................................................. 165/9.1
[51] Int. Cl. ............................................ F23l 15/02
[58] Field of Search ....................... 165/9.1, 9.2, 9.3, 165/9.4

[56] References Cited
UNITED STATES PATENTS

| | | | |
|---|---|---|---|
| R19,388 | 12/1934 | Claassen .............................. | 165/9.3 |
| 2,577,170 | 12/1951 | Walters ................................ | 165/9.1 |
| 1,964,267 | 6/1934 | Moll et al. ........................... | 165/9.4 |
| 480,879 | 8/1892 | Stevenson ............................ | 165/9.1 |
| 1,976,575 | 10/1934 | MacDonald ........................ | 165/9.1 |

FOREIGN PATENTS OR APPLICATIONS

| | | | |
|---|---|---|---|
| 701,019 | 12/1953 | Great Britain ....................... | 165/9.4 |

*Primary Examiner*—John J. Camby
*Attorney*—Watson, Cole et al.

[57] ABSTRACT

The invention relates to refractory members for use in the construction, by stacking of a number of such members, thermal regenerators or recuperators, such as those used in conjunction with glass or metallurgical furnaces, for recovering the heat contained in flue gases. The invention provides that the refractory member is formed of a monolithic structure cast from fused refractory oxides. The member is in plan aspect shape composed predominantly of elongated portions, each having over the greater part of its length a maximum width which does not exceed 50 mm. The overall dimensions of the refractory member are sufficient to afford stability in stacking. The member may be star-shaped in plan aspect and it is advantageously formed by a number of parallelepipedal members joined together by casting into a monolith.

5 Claims, 6 Drawing Figures

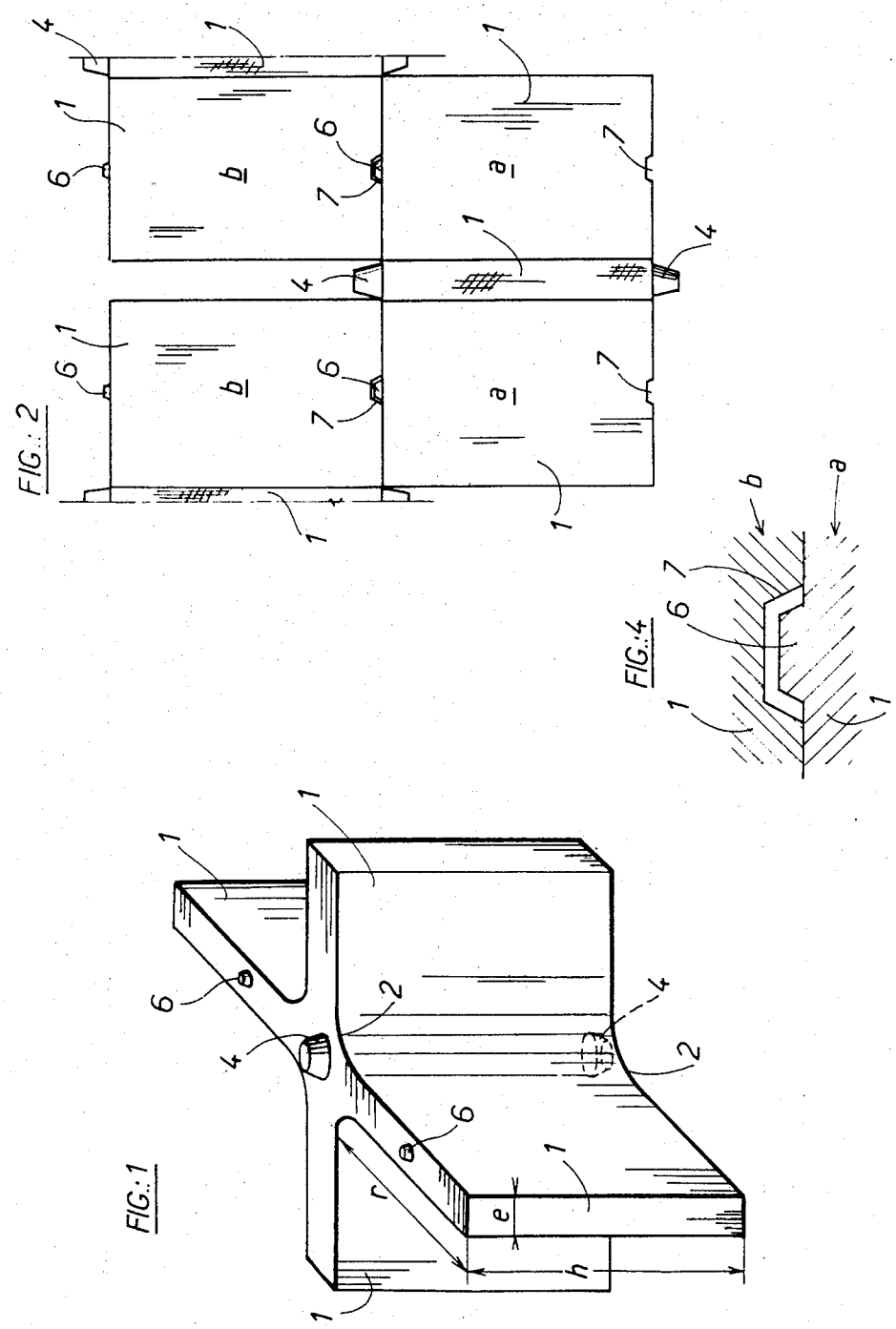

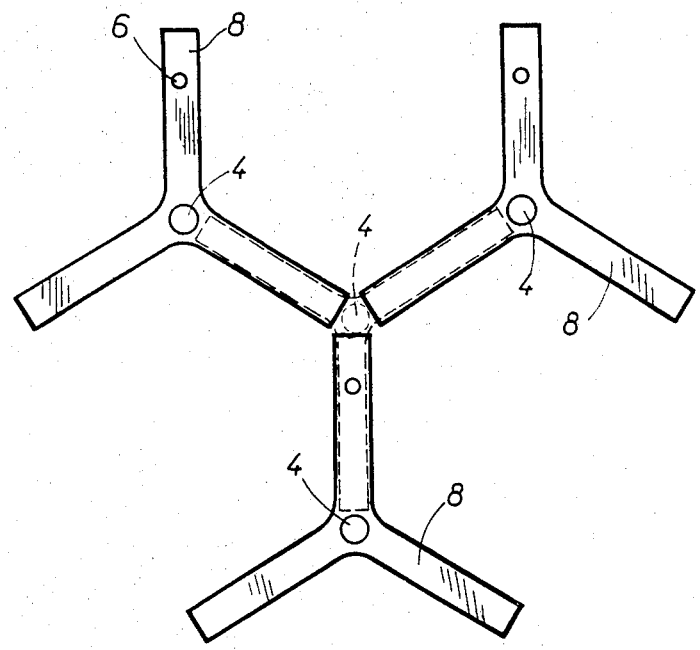
FIG.:5

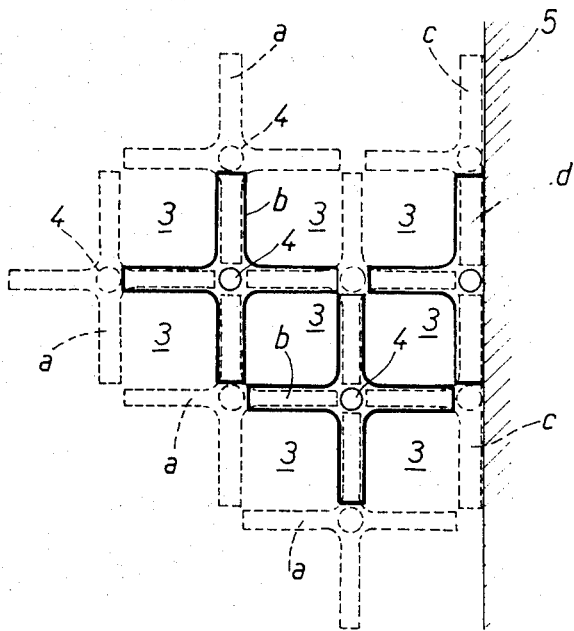
FIG.: 3
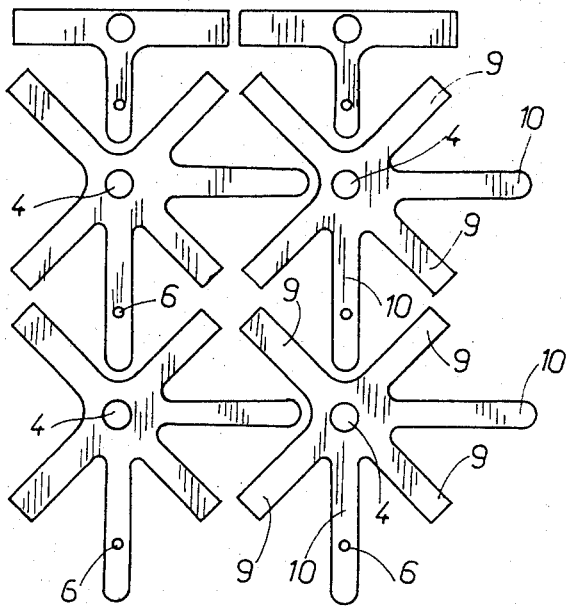
FIG.: 6

REFRACTORY MEMBERS FOR USE IN TERMINAL REGENERATORS OR RECUPERATORS

The present invention refers to refractory members for use in apparatus intended to recover the heat conveyed in fluids. Apparatus of this type, called "regenerators" are used in conjunction with large industrial furnaces such as glass furnaces, Martin furnaces, their function being to recover the heat from the flue gases escaping from these furnaces and to restore it to the combustion air a sometimes to the fuel.

Such apparatus generally comprises a stack of refractory bricks forming between them channels for the passage of the gases or air, and operates according to a periodic cycle consisting of alternating phases of passage of the hot flue gases or exhaust gases to heat up the bricks and of passage of the combustion air or fuel to heat up this fluid from the heat stored in the bricks.

The bricks most often employed are conglomerates of refractory oxides amongst which may be mentioned: magnesia, mixtures of chromite and magnesia, mixtures of silica and alumina, and silica alone.

In studying the working conditions of these regenerators, the applicant has found that their thermal efficiency, that is, the ratio between the amount of heat recovered in the heated air and the amount of heat available in the flue gases, is not what it might be and that this fact is due particularly to the thickness of the bricks employed; in fact in practice even at the smallest dimensions of the bricks, thicknesses of 63, 70, 110 and even sometimes 160 mm can be observed.

This relatively large thickness arises from the fact that the compressive strength of the conglomerates constituting the bricks in the stacks gets very low at the high temperatures which can be reached in operation and that in consequence the bricks have to be given a thickness sufficient for there to exist at the core of each brick a central zone of which the temperature in operation remains smaller than the temperature reached by the surface zones during the heating phases. Moreover the choice of a large thickness is useful for the stability of the stack.

The applicant has found that the thermal efficiency could be improved by forming the refractory stacks for use in the construction, by stacking of a number of such members, of recuperators or regenerators no longer of agglomerated or fritted material but instead the refractory member is cast as a monolithic structure formed from fused refractory oxides and has in plan aspect a shape composed wholly or predominantly of elongated portions each having over the greater part of its length a width or maximum witdh which does not exceed 50 mm and wherein its overall dimensions are sufficient to afford stability in stacking.

A suitable shape of the parts is that which is equivalent to a number of parallelepipedal components joined together by casting into a monolithic whole. It may be shaped in plan aspect, as a closed figure and/or with radiating arms.

The refractory oxides suitable comprises silica, alumina, zirconia, magnesia, chromium oxide, etc., alone or mixed, the choice of the oxides or the composition of the mixtures being determined in accordance with the nature and the particular aggressiveness of the gases or fuel gases coming into contact with the stack in the regenerator.

For example, for regenerators associated with glass furnaces, the applicant has obtained good results by fusing in an electric furnace a charge determined so as to obtain the following composition in the pour:

| | |
|---|---|
| $SiO_2$ | 16% |
| $Al_2O_3$ | 50% |
| $ZrO_2$ | 33% |

Remainder $Na_2O$ and impurities.

Another composition suitable for the regenerators of glass and metallurgical furnaces is the following:

| | |
|---|---|
| $SiO_2$ | 20% |
| $Al_2O_3$ | 70% |
| $ZrO_2$ | 5% |

Remainder $Fe_2O_3$, $TiO_2$, CaO and $Na_2O$; for the regenerators of metallurgical furnaces one can also use:

| | |
|---|---|
| $Al_2O_3$ | 96% |
| $Na_2O$ | 4% | or even practically pure $Al_2O_3$.

In an unexpected way the industrial advantages secured by the invention are very great.

Besides the improvement in the thermal efficiency, the invention enables a reduction in the volume of the regenerators to be achieved, thanks to the reduced thickness of the parts for the same sections of gas channels, and a prolonging of the length of service due to better resistance to corrosion, to reduction of the risk of clogging of the gas channels and to better stability. Furthermore the heating-up time by the flue gases as well as the heating time of the combustion air or fuel can be reduced thanks to the good thermal conductivity of the electrically fused oxides; for this reason the alternation in the operation of the two regenerators which are generally associated with one and the same furnace can be much more rapid.

The attached drawing given by way of example will enable the nature of the invention and the manner of putting it to work to be better understood.

FIG. 1 displays in perspective a stack member according to one embodiment in accordance with the invention, cast in the form of a four-armed star;

FIGS. 2 and 3 show in elevation and plan a portion of a generator stack formed of members as FIG. 1;

FIG. 4 is a sectional view on a larger scale showing a detail of FIG. 2;

FIG. 5 shows in horizontal projection stack members according to a further embodiment of the invention in the form of three-armed stars; and FIG. 6 shows in the same way members according to a yet further embodiment of the invention having a larger number of radial arms.

The part represented in FIG. 1 has in plan aspect the shape of a cross with four arms 1, equivalent almost to four bricks of parallel piped shape, joined together along one long edge but forming a monolith, due to manufacture by casting. The thickness $e$ of each of the radial arms is not more than 50 mm. Good results have been obtained with a thickness of 40 mm. At the centre the thickness can be a little greater by reason of fillets 2 provided to give a good connection between the arms. The radial dimension $r$ of the arms is at least sufficient to afford stability in stacking. Good results have been obtained by taking about 165 mm for $r$ and about 150 mm for the height $h$ of the arms.

By juxtaposition and stacking members of such members, a series is obtained of square-section vertical chimneys 3 intended for the passage of gases. In order to increase the stability of the whole the members are offset at each layer by half a cross, so that the arms of a member in one layer rest on arms of four members in the layer just underneath. This is apparent from FIG. 3 in which members *a* of one layer have been shown in dotted lines and members *b* of the layer above in full lines, assuming in the drawing unequal thicknesses so that the outlines of the members of the two stages are distinguishable. A boss 4 is formed in casting at the top and bottom of a hub portion from which the arms radiate, and these bosses assist in stacking being performed properly, each boss seating (see FIG. 2) between the arms of four members of upper and lower layers. At the sides of the stack next to the casing 5 of the regenerator, which can be produced in any suitable manner, the members could have only three arms as seen with the members designated *c* and *d* in FIG. 3.

The arms of the members or some of them can in addition have at one end, for example on top, a small conical boss 6 formed in casting and matching a recess of the same shape 7 at the other end so that during stacking, the seating of the bosses 6 on the members of one stage in the recesses 7 in the members of the stage above ensures the correct relative position of the members. This arrangement enormously facilitates erection and increases the stability of the whole.

By way of variant FIG. 5 shows members cast in the shape of a star with three arms 8 set at 120° from one another. Stacking can be effected in a manner similar to that described in relation to FIG. 3.

This type of part enables channels to be obtained for the passage of the gases, of hexagonal section less susceptible to clogging.

Other executions can naturally be very well imagined. For example, FIG. 6 displays members each having six arms, four of them 9 being arranged in a cross whilst two others 10 of greater radial dimension lie in two of the spaces between the arms of the cross.

It will be understood that such an arrangement enables the heating surface to be increased, but by reducing the section of the channels. It can thereby be more susceptible to clogging and will be used if the nature of the gases only gives a small risk of clogging.

In this execution as in the preceding ones the members can be offset from one layer to the next so that the arms 9 of the members of one layer rest on the arms 9 of four members of the layer below.

All these shapes are easy to effect by casting, starting from a charge of refractory oxides previously fused. In particular the casting device can be used which is described in the U.S. Patent Application filed by the present applicants on May 26, 1971 under Ser. No. 146,962, now U.S. Pat. No. 3,697,037.

It goes without saying, moreover, that the embodiments described with reference to the drawings are only examples and that it would be possible to modify them, particularly by substitution of equivalents without thereby departing from the scope of the invention as defined in the appendant claims.

We claim:

1. A stackable refractory member useful for constructing thermal regenerators or recuperators, said member being constructed of fused, cast refractory oxides and comprising:

an elongated hub portion having a major longitudinal axis extending centrally thereof in the direction of said elongation thereof; and at least three identical arm portions which are integral with said hub portion and which extend radially outwardly from said axis, the dimension of each of said arm portions in a direction parallel to said axis being substantially coextensive with the length of the hub portion along said axis, the width of each of said arm portions in a direction perpendicular to both said radial extension thereof and said dimension thereof being 50 mm or less, said arm portions being angularly distributed about said axis.

2. A refractory member as set forth in claim 1 wherein said arm portions are angularly spaced about said axis in substantially equidistant relative relationship.

3. A refractory member as set forth in claim 1 wherein said arm portions are generally parallelepipedal in shape.

4. A refractory member as set forth in claim 2 wherein are included three arm portions spaced 120° apart about said axis.

5. A refractory member as set forth in claim 2 wherein are included four arm portions spaced 90° apart about said axis.

* * * * *

UNITED STATES PATENT OFFICE
CERTIFICATE OF CORRECTION

Patent No. 3,777,805　　　　　Dated December 11, 1973

Inventor(s) Joseph Recasens, Pierre Blanchet & Jacques Duchenoy

It is certified that error appears in the above-identified patent and that said Letters Patent are hereby corrected as shown below:

On the title page of the patent, in column 1, under "[75] Inventors:", delete "Racasens" and substitute -- Recasens -- .

On the title page of the patent, and at the beginning of Column 1 thereof, in the title to the invention, delete "TERMINAL" and substitute -- THERMAL -- .

Signed and sealed this 7th day of May 1974.

(SEAL)
Attest:

EDWARD M. FLETCHER, JR.　　　　C. MARSHALL DANN
Attesting Officer　　　　　　　　Commissioner of Patents